United States Patent
Rozenbaum

(10) Patent No.: US 11,811,717 B2
(45) Date of Patent: Nov. 7, 2023

(54) USER PREFERENCE BASED MESSAGE FILTERING IN GROUP MESSAGING

(71) Applicant: International Business Machines Corporation, Armonk, NY (US)

(72) Inventor: Nir Rozenbaum, Yoqneam Illit (IL)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 17/202,041

(22) Filed: Mar. 15, 2021

(65) Prior Publication Data
US 2022/0294754 A1 Sep. 15, 2022

(51) Int. Cl.
| | |
|---|---|
| G06F 15/16 | (2006.01) |
| H04L 51/42 | (2022.01) |
| H04L 51/04 | (2022.01) |
| G06Q 50/00 | (2012.01) |
| H04L 51/216 | (2022.01) |
| G06F 40/30 | (2020.01) |

(52) U.S. Cl.
CPC .............. *H04L 51/42* (2022.05); *G06Q 50/01* (2013.01); *H04L 51/04* (2013.01); *H04L 51/216* (2022.05); *G06F 40/30* (2020.01)

(58) Field of Classification Search
CPC ....... H04L 51/42; H04L 51/216; H04L 51/04; G06Q 50/01; G06F 40/30
USPC .......................................................... 709/206
See application file for complete search history.

(56) References Cited

U.S. PATENT DOCUMENTS

| | | | | |
|---|---|---|---|---|
| 7,159,011 B1* | 1/2007 | Knight | ................. | G06F 16/951 |
| | | | | 707/E17.108 |
| 8,667,069 B1* | 3/2014 | Connelly | ................ | H04L 51/52 |
| | | | | 709/206 |
| 8,856,305 B2* | 10/2014 | Blacka | ................ | G06F 16/9566 |
| | | | | 726/1 |
| 9,110,953 B2 | 8/2015 | Steinberg | | |
| 11,741,400 B1* | 8/2023 | Fu | ........................... | G10L 17/06 |
| | | | | 705/5 |
| 2003/0020750 A1* | 1/2003 | Brown | ................ | G06F 16/9535 |
| | | | | 715/752 |
| 2004/0154022 A1 | 8/2004 | Boss | | |
| 2016/0063117 A1* | 3/2016 | Carter | ............... | G06F 16/24575 |
| | | | | 707/727 |
| 2016/0283589 A1* | 9/2016 | Bostick | .................. | G06Q 50/01 |
| 2017/0142036 A1* | 5/2017 | Li | .......................... | H04L 51/04 |

(Continued)

FOREIGN PATENT DOCUMENTS

CN           110413770 A       11/2019

OTHER PUBLICATIONS

Adams et al., "Conversational Thread Extraction and Topic Detection in TextBased Chat", Chapter 6, Semantic Computing, Copyright 2010 the Institute of Electrical and Electronics Engineers, Inc., pp. 1-27, <https://ieeexplore.ieee.org/document/5559058>.

(Continued)

*Primary Examiner* — Imad Hussain
(74) *Attorney, Agent, or Firm* — David B. Woycechowsky

(57) ABSTRACT

A group message in a messaging group is received. A topic of the group message is determined. One or more recipients of the group message based on the topic of the group message is determined. The recipient is a member of the messaging group. The group message to the determined one or more recipients is transferred.

15 Claims, 5 Drawing Sheets

(56) References Cited

U.S. PATENT DOCUMENTS

| | | | | |
|---|---|---|---|---|
| 2018/0123993 | A1 | 5/2018 | Song | |
| 2018/0131653 | A1 | 5/2018 | Beausoleil | |
| 2018/0285359 | A1* | 10/2018 | Bostick | G06F 40/30 |
| 2018/0287982 | A1* | 10/2018 | Draeger | H04L 51/216 |
| 2021/0209121 | A1* | 7/2021 | Liu | G06F 40/40 |
| 2022/0058753 | A1* | 2/2022 | Bodin | G06F 16/9536 |

OTHER PUBLICATIONS

Adams, et al., "Topic Detection and Extraction in Chat", IEEE Explore, The IEEE International Conference on Semantic Computing, DOI: 10.1109/ICSC.2008.61 Downloaded on Jan. 19, 2021, pp. 1-8.

Disclosed Anonymously et al, "Group Chatting Spots in Social Software", ip.com Prior Art Database Technical Disclosure, IPCOM000261706D, Mar. 30, 2020, pp. 1-4.

Disclosed Anonymously et al, "Interests View for Unread Messages Based on Cognitive Computing and Emotion Detection", ip.com Prior Art Database Technical Disclosure, IPCOM000248900D, Jan. 20, 2017, pp. 1-8.

Disclosed Anonymously et al., "Technique for Content Based Alerts in Multi-Person Group Chat Discussions", ip.com Prior Art Database Technical Disclosure, IPCOM000240056D, Dec. 29, 2014, pp. 1-4.

Google Cloud, "Speech-To-Text", Last Printed Jan. 19, 2021, pp. 1-9, <https"//cloud.google.com/speech-to-text>.

Hu et al., "Personalized Recommendation Algorithm Based on Preference Features", IEEE Explore, Tsinghua Science and technology ISSN 1007-0214, Aug. 2011, vol. 19, No. 3, Jun. 2014, pp. 1-7.

IBM, "Watson Speech to Text", pp. 1-10, Last Printed Jan. 19, 2021, <https:www.ibm.com/cloud/Watson-speech-to-text>.

Singh et al., "A Survey: Speech Recognition Approaches and Techniques" 2018 5th IEEE Uttar Pradesh Section International Conference on Electrical, Electronics and Computer Engineering (UPCON), Gorakhpur, 2018, pp. 1-4, Doi: 10.1109/UPCON.2018.8596954.

Taskiran et al., "Automated Video Summarization Using Speech Transcripts", IEEE Xplore, Aug. 2006, IEEE Transactions on Multimedia 8(4); DOI: 10.1109/TMM 2006.76282, pp. 1-7, <https://www.researchgate.net/publication/3424437_Automated_Video_Program_Summarization_Using_Speech_Transcripts#fullTextFileContent>.

Zhang et al., "Survey of Image Recognition Algorithms", 2020 IEEE 4th Information Technology, Networking, Electronic and Automation Control Conference (ITNEX 2020), vol. 1, pp. 1-7.

\* cited by examiner

USER PREFERENCE BASED MESSAGE FILTERING IN GROUP MESSAGING

BACKGROUND

The present invention relates generally to the field of group messaging, and more particularly to message filtering in group messaging using user preferences.

Group messaging is a feature on any number of computer and/or mobile application(s) that allows for a first group member to send a textual or multimedia (voice, image, or video) message which is then broadcasted to all group members simultaneously. If any member of all of the group members sends a message, the first group member will receive the message. Data transfer of the messages is done through a network that allows for the communication between computer and/or mobile devices.

SUMMARY

Embodiments of the present invention disclose a computer-implemented method, a computer program product, and a system for messaging. In one embodiment, a group message in a messaging group is received. A topic of the group message is determined. One or more recipients of the group message based on the topic of the group message is determined. The recipient is a member of the messaging group. The group message to the determined one or more recipients is transferred.

DETAILED DESCRIPTION

The present invention provides a method, computer program product, and computer system for user preference-based message filtering in group messaging. Embodiments of the present invention recognize that when a user is involved with a messaging group, there is no option for the user to only receive a portion of the messages in the group. Embodiments of the present invention recognize that group messaging may be problematic when a user wants to participate in a messaging group in order to receive messages about a first topic but does not want to receive messages about any other topics in the group. Embodiments of the present invention recognize with the increasing amount of messaging groups; it is challenging to keep track of all of the messages in a group chat along with storing all of the messages in the group chat which can require a large space on the local device and consume network bandwidth when receiving/downloading the message in the group, especially multimedia messages like images or videos.

It should be noted, for clarity, a group message refers to a single message sent in a messaging group. Additionally, a messaging group refers to a group of users where one user can send a message that will be broadcasted to all other users within the group.

Embodiments of the present invention provides a computer-implemented method, computer program product, and system for filtering incoming messages (including text, voice, images and videos) in group messaging based on the user preferences and the message context, where every user could select (or get suggestions from the server) a set of topics or areas of interest. Then, only the messages which are relevant to the selected topics will be received in the user device, while other messages will be filtered out in the server side and thus, it will reduce the volume of incoming messages, the device used storage area and the network bandwidth used by the device.

Figure 1:
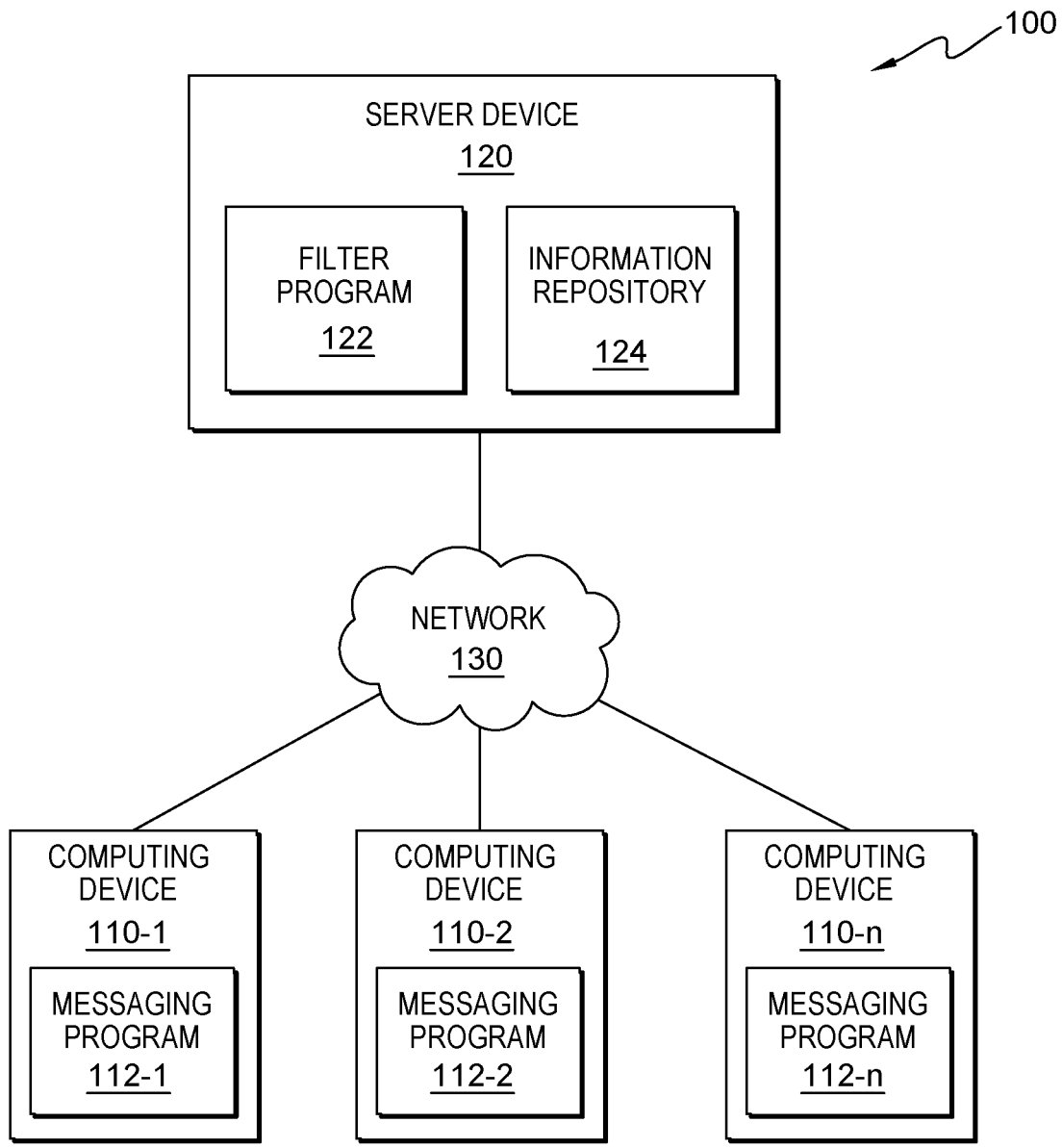
FIG. 1 is a functional block diagram of a network computing environment, generally designated 100, suitable for operation of filter program 122, in accordance with at least one embodiment of the invention.

Referring now to various embodiments of the invention in more detail, FIG. 1 is a functional block diagram of a network computing environment, generally designated 100, suitable for operation of filter program 122, in accordance with at least one embodiment of the invention. FIG. 1 provides only an illustration of one implementation and does not imply any limitation with regard to the environments in which different embodiments may be implemented. Many modifications to the depicted environment may be made by those skilled in the art without departing from the scope of the invention as recited by the claims.

Network computing environment 100 includes computing device 110-1, computing device 110-2, computing device 110-n, and server device 120 interconnected over network 130. In embodiments of the present invention, network 130 can be a telecommunications network, a local area network (LAN), a wide area network (WAN), such as the Internet, or a combination of the three, and can include wired, wireless, or fiber optic connections. Network 130 may include one or more wired and/or wireless networks that are capable of receiving and transmitting data, voice, and/or video signals, including multimedia signals that include voice, data, and video formation. In general, network 130 may be any combination of connections and protocols that will support communications between computing device 110-1, computing device 110-2, computing device 110-n, server device 120, and other computing devices (not shown) within network computing environment 100.

Computing device 110-1, computing device 110-2, and computing device 110-n may be any number "n" of computing devices. For simplicity, computing device 110-1, computing device 110-2, and computing device 110-n will be described in reference to computing device 110-n. Computing device 110-n represents a computing device that can be a laptop computer, tablet computer, netbook computer, personal computer (PC), a desktop computer, a personal digital assistant (PDA), a smartphone, smartwatch, or any programmable electronic device capable of receiving, sending, and processing data. In general, computing device 110-$n$ represents any programmable electronic devices or combination of programmable electronic devices capable of executing machine readable program instructions and communicating with other computing devices (not shown) within computing environment 100 via a network, such as network 130.

In various embodiments of the invention, computing device 110-$n$ may be a computing device that can be a standalone device, a management server, a web server, a media server, a mobile computing device, or any other programmable electronic device or computing system capable of receiving, sending, and processing data. In other embodiments, computing device 110-$n$ represents a server computing system utilizing multiple computers as a server system, such as in a cloud computing environment. In an embodiment, computing device 110-$n$ represents a computing system utilizing clustered computers and components (e.g., database server computers, application server computers, web servers, and media servers) that act as a single pool of seamless resources when accessed within network computing environment 100.

In an embodiment, computing device 110-$n$ includes a user interface (not shown). A user interface is a program that provides an interface between a user and an application. A user interface refers to the information (such as graphic, text, and sound) a program presents to a user and the control sequences the user employs to control the program. There are many types of user interfaces. In one embodiment, a user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements. In an embodiment, the user interface of computing device 110-$n$ allows for interaction with messaging program 112-$n$.

In various embodiments of the invention, computing device 110-$n$ includes messaging program 112-$n$. Computing device 110-1, computing device 110-2, and computing device 110-$n$ may include messaging program 112-1, messaging program 112-2, and messaging program 112-$n$, respectively. As noted above, messaging program 112-$n$ may be any number "n" of messaging programs. For simplicity, messaging program 112-1, messaging program 112-2, and messaging program 112-$n$ will be described in reference to messaging program 112-$n$. In an embodiment, messaging program 112-$n$ is, in simplest terms, any type of program that allows for data transfer between any two or more messaging program 112-$n$ via network 130. In other words, messaging program 112-$n$ allows a user, via the user interface described above, to send a textual or multimedia (voice, image, or video) message to any other user.

For example, User A on Computing Device A may type a message, "Good Morning" in messaging program A via the user interface of Computing Device A, and transfer the message to Computing Device B, and user B will be able to view the message, "Good Morning" in messaging program B via the user interface on Computing Device B. In an embodiment, this is considered a direct message between two parties (User A and User B). In an alternative embodiment, the messaging may involve two or more recipients, as in the scenario of a messaging group. For example, User A on Computing Device A may type a message, "Good Morning" in messaging program A via the user interface of Computing Device A, and transfer the message to the group members involved in the messaging group, in other words to Computing Device B and Computing Device C, and user B will be able to view the message, "Good Morning" in messaging program B via the user interface on Computing Device B along with user C will be able to view the message, "Good Morning" in messaging program C view the user interface on Computing Device C, respectively.

Server device 120 represents a computing device that can be a laptop computer, tablet computer, netbook computer, personal computer (PC), a desktop computer, a personal digital assistant (PDA), a smartphone, smartwatch, or any programmable electronic device capable of receiving, sending, and processing data. In general, server device 120 represents any programmable electronic devices or combination of programmable electronic devices capable of executing machine readable program instructions and communicating with other computing devices (not shown) within computing environment 100 via a network, such as network 130.

In various embodiments of the invention, server device 120 may be a computing device that can be a standalone device, a management server, a web server, a media server, a mobile computing device, or any other programmable electronic device or computing system capable of receiving, sending, and processing data. In other embodiments, server device 120 represents a server computing system utilizing multiple computers as a server system, such as in a cloud computing environment. In an embodiment, server device 120 represents a computing system utilizing clustered computers and components (e.g., database server computers, application server computers, web servers, and media servers) that act as a single pool of seamless resources when accessed within network computing environment 100.

In an embodiment, server device 120 includes a user interface (not shown). A user interface is a program that provides an interface between a user and an application. A user interface refers to the information (such as graphic, text, and sound) a program presents to a user and the control sequences the user employs to control the program. There are many types of user interfaces. In one embodiment, a user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements. In an embodiment, the user interface of server device 120 allows for interaction with filter program 122.

In various embodiments of the invention, server device 120 includes filter program 122. In an embodiment, filter program 122 allows for analyzing message, topic creating/modification, labeling messages with topics, etc. In an embodiment, filter program 122 allows for choosing message topics based on user input. In an embodiment, filter program 122 allows for choosing message topics based on ancillary data. In an embodiment, filter program 112 allows for receiving a message, processing the message, analyzing the message for one or more topics and transferring the message to one or more recipients based on the determined topic. In an embodiment, filter program 122 allows for providing topic/message summaries. As referred to herein, all data retrieved, collected, and used, is used in an opt-in manner, i.e., the data provider has given permission for the data to be used. For example, the data received and used by filter program 122.

In an embodiment, server device 120 includes an information repository 124. In an alternative embodiment, information repository 124 may be managed by the operating system of server device 120, another program (not shown), alone, or together with, filter program 122. Information repository 124 is a data repository that can store, gather, and/or analyze information. In some embodiments, information repository 124 is located externally to server device 120 and accessed through a communication network, such as network 130. In some embodiments, information repository 124 is stored on server device 120. In some embodiments, information repository 124 may reside on another computing device (not shown), provided information repository 124 is accessible by server device 120. In an embodiment, information repository 124 may include page factors which include, but is not limited to, user filters, message topics per messaging group, cross group preferences per user, messages per messaging group, topic information per messaging group, feedback information from users, and recommendation topics per user. In an embodiment, topic information per messaging group includes, but is not limited to, list of participants in the messaging group, number of text messages in the messaging group, number of text messages by topic in the messaging group, number of voice messages in the messaging group, number of voice messages by topic in the messaging group, number of images in the messaging group, number of images by topic in the messaging group, number of videos in the messaging group, number of videos by topic in the messaging group and a set of key terms that were used during the group chat and the frequency of use of the key terms. In an embodiment, key terms are one or more words that correlate to a topic with the highest frequency of use in that particular topic. For example, the topic may be "Football" and a key term may be the name of a specific football team or football player.

Information repository 124 may be implemented using any volatile or non-volatile storage media for storing information, as known in the art. For example, information repository 124 may be implemented with a tape library, optical library, one or more independent hard disk drives, multiple hard disk drives in a redundant array of independent disks (RAID), solid-state drives (SSD), or random-access memory (RAM). Similarly, information repository 124 may be implemented with any suitable storage architecture known in the art, such as a relational database, an object-oriented database, or one or more tables.

Figure 2:
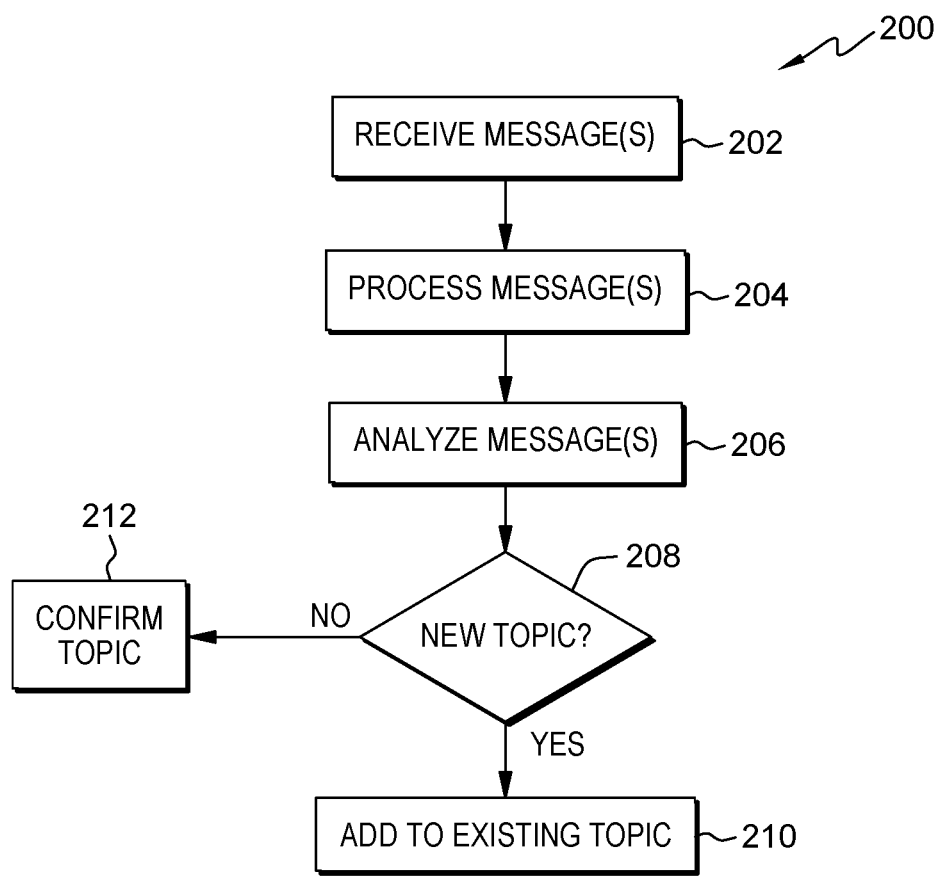
FIG. 2 is a flow chart diagram depicting operational steps for filter program 122 for analyzing message, topic creating/modification, message placement in topics, etc., in accordance with at least one embodiment of the invention.

FIG. 2 is a flow chart diagram of workflow 200 depicting operational steps for filter program 122 in accordance with at least one embodiment of the invention. In an alternative embodiment, the steps of workflow 200 may be performed by any other program, not shown, while working with filter program 122. It should be appreciated that embodiments of the present invention provide at least for analyzing message, topic creating/modification, labeling messages with topics, etc. However, FIG. 2 provides only an illustration of one implementation and does not imply any limitations with regard to the environments in which different embodiments may be implemented. Many modifications to the depicted environment may be made by those skilled in the art without departing from the scope of the invention as recited by the claims. In a preferred embodiment, workflow 200 may be invoked upon a user wanting to include user preference-based message filtering in group messaging.

Filter program 122 receives message(s) (step 202). At step 202, filter program 122 receives one or more message(s) in a messaging group. As noted above, a messaging group is a group of users who are part of a group in which when one message is sent by a single user and every user in the messaging group receives the message. In first embodiment, filter program 122 may receive all messages that have occurred in a messaging group so far. In the first embodiment, this may be upon initial setup of filter program 122 to manage the messages in the messaging group. In a second embodiment, filter program 122 may receive a single "new" message that is being analyzed to be added to topics already created (or may create a new topic). In this second embodiment, this may be after initial setup of filter program 122 to manage the messaging group and real-time managing of topics in the messaging group. In an embodiment, if filter program 122 receives multiple message(s) with multiple topic(s) then steps of workflow 200 will be repeated for each message topic(s).

Filter program 122 processes message(s) (step 204). At step 204, filter program 122 processes any message that is a non-text media form to a text media form. In an embodiment, if the received message is already in text no processing needs to be done. In an embodiment, if the message is non-text (i.e., voice, image, or video) then the message will be processed into text. In an embodiment, if the message is voice or audio, filter program 122, alone or with another program (not shown), may process the audio using speech to text technologies or any other equivalent tools known in the art. In an embodiment, if the message is an image, filter program 122, alone or with another program (not shown), may process the image using image recognition tools to extract the objects and their description from the image as well as use text written by the user that describes the image to convert the image into text or any other equivalent tools known in the art. In an embodiment, if the message is a video, filter program 122, alone or with another program (not shown), may process the video using a combination of video summarization techniques with any or all of the technologies to process audio and/or images noted above.

Filter program 122 analyzes message(s) (step 206). At step 206, filter program 122 analyzes the processed messages to determine one or more topics for the message(s). In an embodiment, each message of the message(s) has a topic(s). In an embodiment, filter program 122 uses natural language processing on the processed message(s) to extract topic(s) of the message(s). In an embodiment, filter program 122 labels each message with a topic using metadata. In an embodiment, topic extraction and determination may be done solely upon the message being analyzed. In an alternative embodiment, topic extraction and determination may also be based on the topics found in the message that analyzed message is responding to. For example, if message B responds to message A, and message B does not have a topic but message A does have a topic, then message B may be labeled with the topic from message A. In an embodiment filter program 122 may store the determined topics per messaging group in information repository 124.

Filter program 122 determines whether the topic is new (decision step 208). At decision step 208, filter program 122 determines whether the topic determined by analyzing the messages in step 206 is a new topic. In an embodiment, filter program 122 compares the determined topic to topics already determined for the messaging group based on information stored in information repository 124. In an embodiment, if there is not a new topic (decision step 208, no branch) then processing proceeds to step 210. If there is a new topic (decision step 208, yes branch) then processing proceeds to step 212.

Filter program 122 adds the message to the existing topic (step 210). At step 210, filter program 122 determines that the message is part of a topic that is already existing and indicates in information repository 124 that the message(s) received in step 202 are associated with that topic. For example, information repository 124 includes a list of messages for topic A and a list of messages for topic B. If the new message is for topic B then filter program 122 adds the message to the list of messages for topic B.

Filter program 122 confirms the topic (step 210). At step 210, filter program 122 confirms the accuracy of the new topic. In an embodiment, filter program 122 may indicate the chosen topic to the user, such as the sender or the receiver(s) of the message. In an alternative embodiment, this may be done by interaction with a user that manages filter program 122 and topics found in information repository 124. In an embodiment filter program 122 may add the new topic and the associated messages to the list in information repository 124 for the new topic and confirmation of the accuracy of the topic may be done by relabeling of messages with a different topic(s) during feedback loop of use as the program learns over time.

Figure 3:
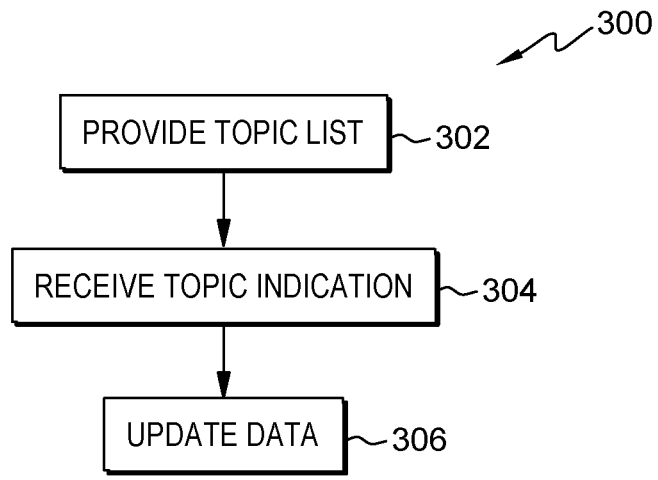
FIG. 3 is a flow chart diagram depicting operational steps for filter program 122 for choosing message topics based on user input, in accordance with at least one embodiment of the invention.

FIG. 3 is a flow chart diagram of workflow 300 depicting operational steps for filter program 122 in accordance with at least one embodiment of the invention. In an alternative embodiment, the steps of workflow 300 may be performed by any other program, not shown, while working with filter program 122. It should be appreciated that embodiments of the present invention provide at least for choosing message topics based on user input. However, FIG. 3 provides only an illustration of one implementation and does not imply any limitations with regard to the environments in which different embodiments may be implemented. Many modifications to the depicted environment may be made by those skilled in the art without departing from the scope of the invention as recited by the claims. In a preferred embodiment, a user, via a user interface (not shown), can invoke workflow 300 upon a user request to receive a list of topics in a messaging group and make a determination on which topics the user would like to block and/or allow.

Filter program 122 provides a topic list (step 302). At step 302, filter program 122 receives an indication from computing device 110-n. In an embodiment, the indication is to provide a list of topics for the indicated messaging group. In other words, a user, via a user interface on computing device 110-n indicates they would like a list of topics found in a messaging group they are participating in. The indication is transmitted to filter program 112 and filter program 122 queries information repository 124 to determine the list of topics for the indicated messaging group. Filter program 122 then provides the list of topics for the indicated messaging group to the requesting device. In an embodiment, the indication may be for a topic list for a singular messaging group. In an alternative embodiment, the indication may be for a topic list for each messaging group of one or more messaging groups.

Filter program 122 receives topic indication (step 304). At step 304, filter program receives a topic indication from computing device 110-n. In an embodiment, the topic indication may be a list of topics to allow messages for in the messaging group. In an embodiment, the topic indication may be a list of topics to block messages for in the messaging group. In an embodiment, the topic indication may be a list of topics to allow messages for and a list of topics to block messages for in the messaging group. In an embodiment, filter program 122 may receive multiple indications, one for each messaging group. In an alternative embodiment, filter program 122 may receive a single indication that includes allow, block, or allow/block indications for topics in each messaging group of one or more messaging groups. In an embodiment, the topic indication may be associated with computing device 110-n. In an alternative embodiment, the topic indication may be associated with a user using computing device 110-n. In other words, the user logged into messaging program 112-n, and filter program 122 receives topic indications for that specific user.

Filter program 122 updates data (step 306). At step 306, filter program 122 updates the data found in information repository 124. In other words, filter program 122 updates information repository 124 to include the topic indications for a user and/or computing device for each messaging group of one or more messaging groups.

Figure 4:
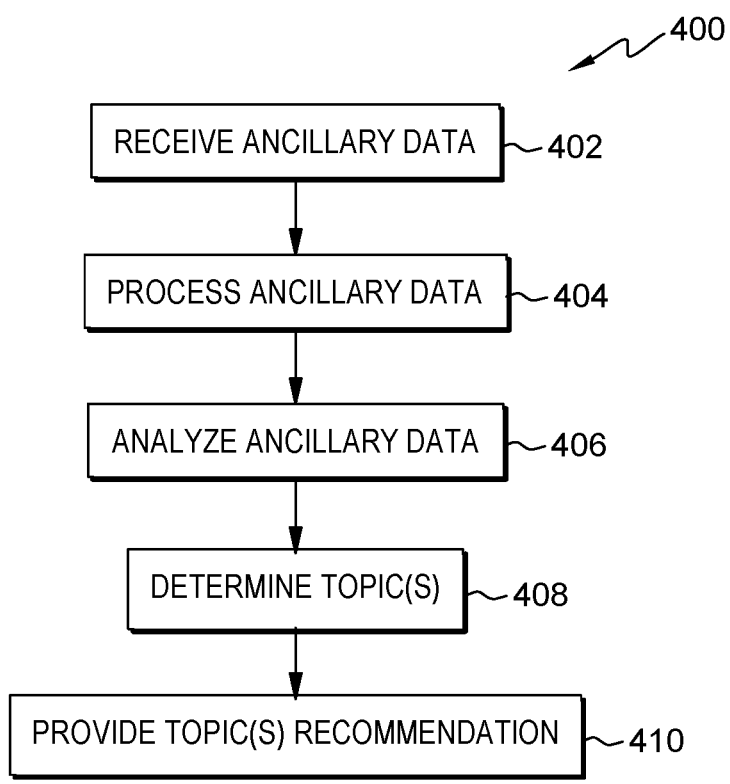
FIG. 4 is a flow chart diagram depicting operational steps for filter program 122 for recommending message topics based on ancillary data, in accordance with at least one embodiment of the invention.

FIG. 4 is a flow chart diagram of workflow 400 depicting operational steps for filter program 122 in accordance with at least one embodiment of the invention. In an alternative embodiment, the steps of workflow 400 may be performed by any other program, not shown, while working with filter program 122. It should be appreciated that embodiments of the present invention provide at least for recommending message topics based on ancillary data. However, FIG. 4 provides only an illustration of one implementation and does not imply any limitations with regard to the environments in which different embodiments may be implemented. Many modifications to the depicted environment may be made by those skilled in the art without departing from the scope of the invention as recited by the claims. In a preferred embodiment, a user, via a user interface (not shown), can invoke workflow 400 upon a user wanting to use ancillary data to get recommendations for message topics.

Filter program 122 receives ancillary data (step 402). At step 402, filter program 122 receives ancillary data from another program not shown. In an embodiment, the ancillary data is associated with a user. In an embodiment, ancillary data includes, but is not limited to, social media data, web history data, or any other data that may be used to determine topics of interest of the user. In an embodiment, the ancillary data may include, but is not limited to, topics the user has indicated as interested and therefore they are listed as topics that allow messages in a messaging group. In an embodiment, the ancillary data may include, but is not limited to, other messaging characteristics of the user in other messaging groups. In other words, if a user responds to a message about Topic A in a messaging group then the ancillary data may be the messages and Topic A.

Filter program 122 processes ancillary data (step 404). At step 404, filter program 122 performs similar processing similar to step 204. In an embodiment, filter program 122 processes any ancillary data that is a non-text media form to a text media form. In an embodiment, if the received ancillary data is already in text no processing needs to be done. In an embodiment, if the ancillary data is non-text (i.e., voice, image, or video) then the ancillary data will be processed into text. In an embodiment, if the ancillary data is voice or audio, filter program 122, alone or with another program (not shown), may process the audio using speech to text technologies or any other equivalent tools known in the art. In an embodiment, if the ancillary data is an image, filter program 122, alone or with another program (not shown), may process the image using image recognition tools to extract the objects and their description from the image as well as use text written by the user that describes the image to convert the image into text or any other equivalent tools known in the art. In an embodiment, if the ancillary data is a video, filter program 122, alone or with another program (not shown), may process the video using a combination of video summarization techniques with any or all of the technologies to process audio and/or images noted above.

Filter program 122 analyzes ancillary data (step 406). At step 406, filter program 122 analyzes the processed ancillary data to determine one or more topics for the ancillary data. At step 406, filter program 122 performs similar processing similar to step 206. In an embodiment, each piece of ancillary has one or more topics. For example, a web history data may be for a web page and the web page, after analysis, is determined to have two topics. In an embodiment, filter program 122 uses natural language processing on the processed ancillary data to extract topic(s) of the ancillary data. In an embodiment filter program 122 may store the determined topics for the ancillary data in information repository 124.

Filter program 122 determine topic(s) (step 408). At step 408, filter program 122 determines if any of the topics found in step 406 match any topics that are found in information repository 124. In a first embodiment, filter program 122 determines if the topic(s) found in step 406 match any blocked topics for the user in any messaging group. For example, if the determined topic(s) in step 406 was "dogs", filter program 122 determines if the topic "dogs" is a blocked topic for any messaging group the user is a part of. In a second embodiment, filter program 122 determines if the topic(s) found in step 406 match any topics in a messaging group the user is part of but not on an allow list for the user in the messaging group with the matching topic. For example, if the determined topic(s) in step 406 was "cats", filter program 122 determines if the topic "cats" is a topic in any messaging group the user is part of and then filter program 122 determines if the topic "cats" is not on an allow list for the user in the messaging group with the matching topic.

Filter program 122 provides the topic(s) (step 410). At step 410, filter program 122 provides the determined topic(s) from step 408 to the user, via computing device 110-*n*. Two examples are found below discussing workflow 400.

In a first example, a user visits a webpage. Filter program 122 receives information about the browsing history of the user and determines the user visits the webpage. Filter program 122 processes the web page, converting any non-text media to text. Filter program 122 analyzes the processed web page to determine that the web page is about the topic "dogs". Filter program 122 determines the user has blocked "dogs" messages in messaging group A and filter program 122 provides the topic "dogs" in messaging group A as a suggested unblock topic or allow topic for the user.

In a second example, a user is participating in messaging group A and messaging group B and filter program 122 receives the information about messaging group A and messaging group B from information repository 124. Filter program 122 determines the topics of messaging group A indicate that the user has said to allow messages about the topic "dogs" in messaging group A. Filter program 122 determines that in messaging group B, the user only indicates to allow messages about the topic "cats", however, there is a topic "dogs" in messaging group B. Filter program 112 may suggest to the user to allow the topic "dogs" in messaging group B as well.

Figure 5:
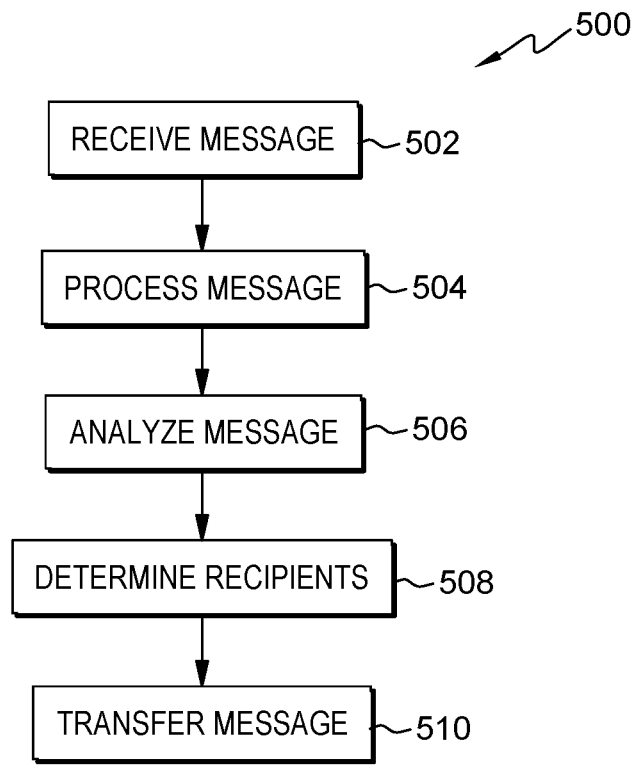
FIG. 5 is a flow chart diagram depicting operational steps for filter program 122 for receiving a message, processing the message, analyzing the message for one or more topics and transferring the message to one or more recipients based on the determined topic, in accordance with at least one embodiment of the invention.

FIG. 5 is a flow chart diagram of workflow 500 depicting operational steps for filter program 122 in accordance with at least one embodiment of the invention. In an alternative embodiment, the steps of workflow 500 may be performed by any other program, not shown, while working with filter program 122. It should be appreciated that embodiments of the present invention provide at least for receiving a message, processing the message, analyzing the message for one or more topics and transferring the message to one or more recipients based on the determined topic. However, FIG. 5 provides only an illustration of one implementation and does not imply any limitations with regard to the environments in which different embodiments may be implemented. Many modifications to the depicted environment may be made by those skilled in the art without departing from the scope of the invention as recited by the claims. In a preferred embodiment, workflow 500 may be invoked upon transmitting message in a messaging group via messaging program 112-*n* using computing device 110-*n* that is filtered by filter program 122.

Filter program 122 receives message (step 502). At step 502, filter program 122 receives a message in a messaging group. In an embodiment, filter program 122 may receive a single "new" message for message filtering. In an embodiment, if filter program 122 receives one or more messages then steps of workflow 500 will be repeated for each message.

Filter program 122 processes the message (step 504). At step 504, filter program 122 performs similar processing similar to step 204. At step 504, filter program 122 processes any message that is a non-text media form to a text media form. In an embodiment, if the received message is already in text no processing needs to be done. In an embodiment, if the message is non-text (i.e., voice, image, or video) then the message will be processed into text. In an embodiment, if the message is voice or audio, filter program 122, alone or with another program (not shown), may process the audio using speech to text technologies or any other equivalent tools known in the art. In an embodiment, if the message is an image, filter program 122, alone or with another program (not shown), may process the image using image recognition tools to extract the objects and their description from the image as well as use text written by the user that describes the image to convert the image into text or any other equivalent tools known in the art. In an embodiment, if the message is a video, filter program 122, alone or with another program (not shown), may process the video using a combination of video summarization techniques with any or all of the technologies to process audio and/or images noted above.

Filter program 122 analyzes the message (step 506). At step 506, filter program 122 analyzes the processed message to determine a topic for the message. At step 506, filter program 122 performs similar processing similar to step 306. In an embodiment, each message has at least one topic. In an embodiment, filter program 122 uses natural language processing on the processed message to extract the one or more topics of the message. In an embodiment, filter program 122 labels each message with a topic using metadata. In an embodiment, topic extraction and determination may be done solely upon the message being analyzed. In an alternative embodiment, topic extraction and determination may also be based on the topics found in the message that analyzed message is responding to. For example, if message B responds to message A, and message B does not have a topic but message A does have a topic, then message B may be labeled with the topic from message A. In an embodiment filter program 122 may store the determined topics per messaging group in information repository 124.

Filter program 122 determines the recipients of the message (step 508). At step 508, filter program 122, using the determined topic of the analyzed message in step 506, compares the determined topic to the allow list and block list for the messaging group. In other words, filter program 122 reviews the allow list and the block list by topic for the messaging group and then determines which messages should be sent to which recipients and which messages should be blocked from being sent to which recipients. In a simple example, filter program 122 determines that a message has a topic T in messaging group G. Filter program 122 queries information repository 124 for the allow list and block list by topic for messaging group G. Filter program 122 determines that person A and person B are on the allow list for topic T and person C is on the block list for topic T.

Filter program 122 transfers the message (step 510). At step 510, filter program 122 transfers the message to messaging program 112-n. In an embodiment, filter program 122 may also not transfer the message to messaging program 112-n in the scenario where the person has the topic on the block list for the messaging group. Continuing with the previous example, filter program 122 will transfer the message M with topic T to person A and person B in the messaging group G due to message M being an allowed message in the group chat based on the topic T. Additionally, filter program 122 will not transfer the message M with topic T to person C in the messaging group G due to message M being a blocked message in the group chat based on the topic T.

Figure 6:
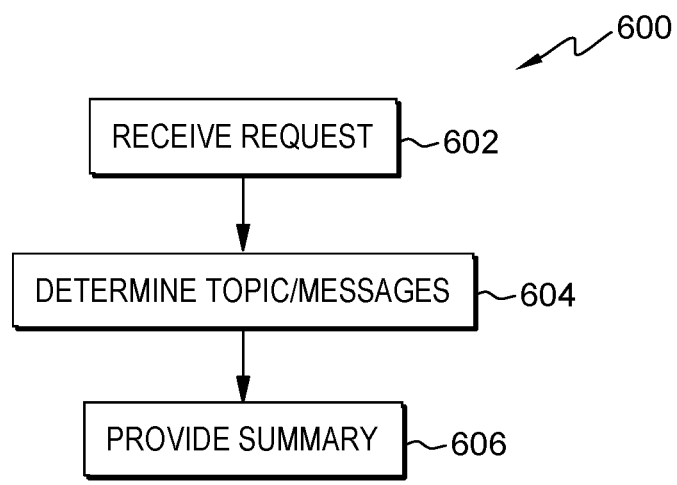
FIG. 6 is a flow chart diagram depicting operational steps for filter program 122 for providing topic/group message summaries, in accordance with at least one embodiment of the invention.

FIG. 6 is a flow chart diagram of workflow 600 depicting operational steps for filter program 122 in accordance with at least one embodiment of the invention. In an alternative embodiment, the steps of workflow 600 may be performed by any other program, not shown, while working with filter program 122. It should be appreciated that embodiments of the present invention provide at least for providing topic/group messages summaries. However, FIG. 6 provides only an illustration of one implementation and does not imply any limitations with regard to the environments in which different embodiments may be implemented. Many modifications to the depicted environment may be made by those skilled in the art without departing from the scope of the invention as recited by the claims. In a preferred embodiment, workflow 600 may be invoked upon a user indicating a request for a summary of the topic/group messages via messaging program 112-n using computing device 110-n that is filtered by filter program 122.

Filter program 122 receives a request (step 602). At step 602, filter program 122 receives a request from messaging program 112-n for a list of topics and a summary of the messages discussed in a messaging group. In an embodiment, filter program 122 may receive a request for a single messaging group. In an embodiment, filter program 122 may receive a request for multiple messaging groups. In an embodiment, the request may include a time period, in other words a summary of all topics/messages in the messaging group in the last time period. In an embodiment, the time period can be expressed in seconds, minutes, hours, day, weeks, months, years, etc. In an embodiment, the request may not include a time period and filter program 122 will determine the time period or alternatively filter program 122 may determine the request is for all topics/messages in the messaging group.

Filter program 122 determines topics/messages (step 604). At step 604, filter program 122 determines topics/messages that match the request received in step 602. As the request is for a messaging group, filter program 122 determines all topics found in the messaging group and filter program 122 determines all messages associated with each topic. In an embodiment, filter program 122 determines the topics/messages based on the time period received in step 602. For example, if the request is for messaging group G, filter program 122 determines there are three topics, A, B, and C found in messaging group G and topic A has twenty messages, topic B has fifty messages, and topic C has one hundred messages.

Filter program 122 provides summary (step 606). At step 606, filter program 122 provides the summary of all the topics/messages that match the request received in step 602 to the computing device 110-n that makes the request. At step 606, the summary may include, but is not limited to, the list of participants in the messaging group, the list of topics in the messaging group, the number of text messages related to the topic(s) in the messaging group, the number of voice messages related to the topic(s) in the messaging group, the number of images related to the topic(s) in the messaging group, the number of video related to the topic(s) in the messaging group, and a set of key terms that were used during the conversation along with the frequency of use.

In an embodiment, the summary provided to the user allows the user to receive a list of topics with the summary of the messages for each topic. In an embodiment, the user may take an action based on this information. For example, if a user has blocked all topics in a messaging group and the user requests a summary for the messaging group. The user may now see the summary of all topics/messages in the messaging group and the user may decide to allow message of topic A, both future messages and past messages. In an embodiment, the past messages will be transferred to the computing device of the user. In an embodiment, the user may choose to only receive specific types of messages, for example text messages, and not receive image messages. In doing so, the user saves storage space on the computing device.

In an example, a user may block all group messages in a messaging group without leaving the messaging group. In other words, the user may block all topics in a messaging group. At a later time, the user may request a summary of all the topics/messages which includes a list of all topics and a summary of messages for each topic. In this example, the user can then request only selected topics and may also request only types of content (text vs. voice vs. image vs. video) in each topic to be delivered to the computing device of the user.

As noted in step 210 above, each message sent to a user will include metadata that indicates the topic of the message. At any time, the user may update, modify, or change the topic as part of a feedback loop in order to increase accuracy of topic labeling for messages.

Figure 7:
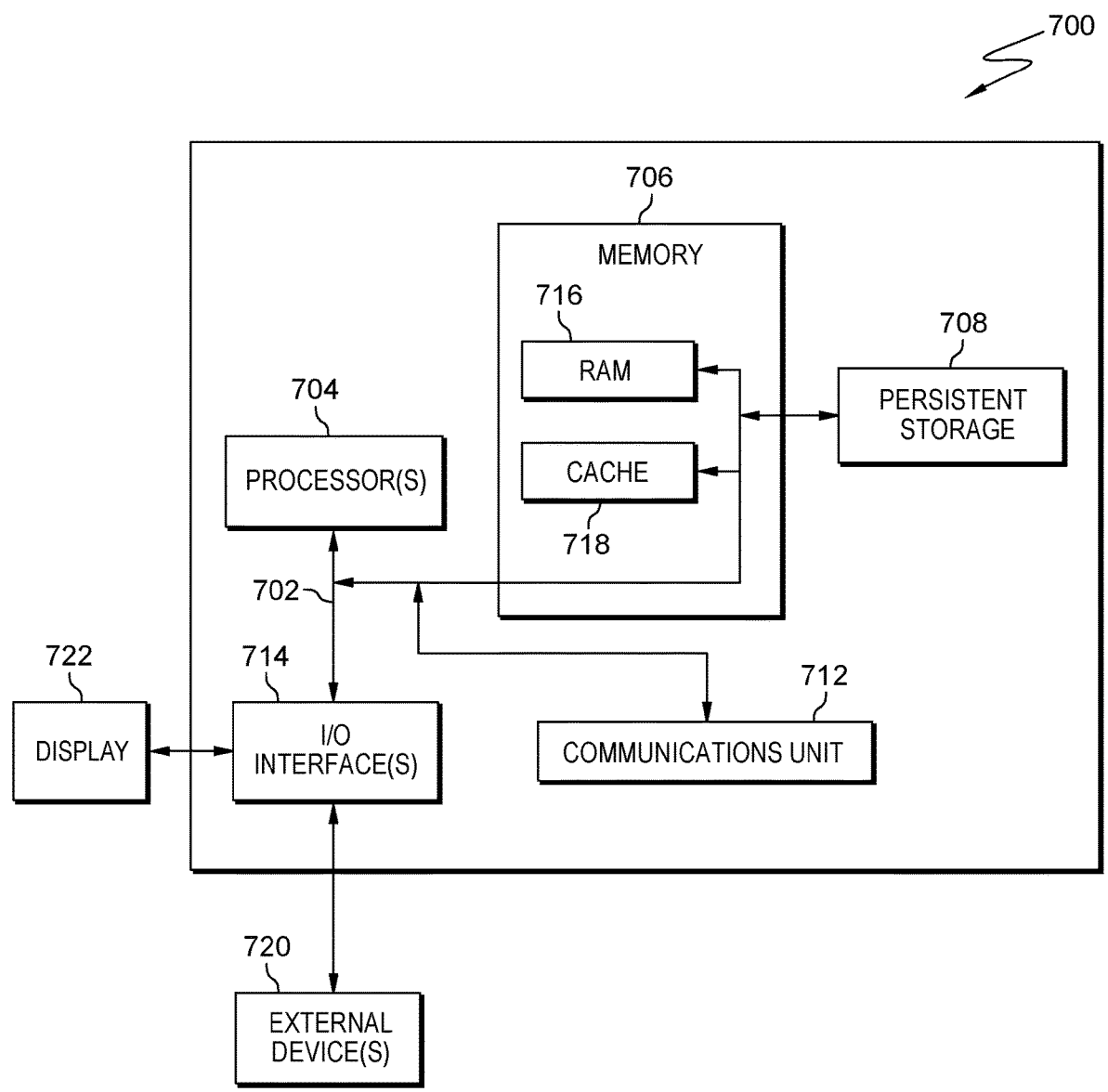
FIG. 7 is a block diagram depicting components of a computer, generally designated 700, suitable for executing filter program 122, in accordance with at least one embodiment of the invention.

FIG. 7 is a block diagram depicting components of a computer 700 suitable for filter program 122, in accordance with at least one embodiment of the invention. FIG. 7 displays the computer 700, one or more processor(s) 704 (including one or more computer processors), a communications fabric 702, a memory 706 including, a RAM 716, and a cache 718, a persistent storage 708, a communications unit 712, I/O interfaces 714, a display 722, and external devices 720. It should be appreciated that FIG. 7 provides only an illustration of one embodiment and does not imply any limitations with regard to the environments in which different embodiments may be implemented. Many modifications to the depicted environment may be made.

As depicted, the computer 700 operates over the communications fabric 702, which provides communications between the computer processor(s) 704, memory 706, persistent storage 708, communications unit 712, and input/output (I/O) interface(s) 714. The communications fabric 702 may be implemented with an architecture suitable for passing data or control information between the processors 704 (e.g., microprocessors, communications processors, and network processors), the memory 706, the external devices 720, and any other hardware components within a system. For example, the communications fabric 702 may be implemented with one or more buses.

The memory 706 and persistent storage 708 are computer readable storage media. In the depicted embodiment, the memory 706 comprises a random-access memory (RAM) 716 and a cache 718. In general, the memory 706 may comprise any suitable volatile or non-volatile one or more computer readable storage media.

Program instructions for filter program 122 may be stored in the persistent storage 708, or more generally, any computer readable storage media, for execution by one or more of the respective computer processors 704 via one or more memories of the memory 706. The persistent storage 708 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by the persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of the persistent storage 708.

The communications unit 712, in these examples, provides for communications with other data processing systems or devices. In these examples, the communications unit 712 may comprise one or more network interface cards. The communications unit 712 may provide communications through the use of either or both physical and wireless communications links. In the context of some embodiments of the present invention, the source of the various input data may be physically remote to the computer 700 such that the input data may be received, and the output similarly transmitted via the communications unit 712.

The I/O interface(s) 714 allow for input and output of data with other devices that may operate in conjunction with the computer 700. For example, the I/O interface 714 may provide a connection to the external devices 720, which may be as a keyboard, keypad, a touch screen, or other suitable input devices. External devices 720 may also include portable computer readable storage media, for example thumb drives, portable optical or magnetic disks, and memory cards. Software and data used to practice embodiments of the present invention may be stored on such portable computer readable storage media and may be loaded onto the persistent storage 708 via the I/O interface(s) 714. The I/O interface(s) 714 may similarly connect to a display 722. The display 722 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adaptor card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, though the Internet using an Internet Service Provider). In some embodiments, electronic circuitry including, for example programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram blocks or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing form the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for messaging, the computer-implemented method comprising:
   receiving, by one or more computer processors, a group message in a messaging group;
   determining, by one or more computer processors, a topic of the group message, with the determination of the topic of the group message including:
   applying speech-to-text software to an audio portion of the group message to obtain text corresponding to the audio portion of the group message, and determining the topic based, at least in part, on the text corresponding to the audio portion of the group message;
   determining, by one or more computer processors, that one or more recipients of the group message has blocked the topic of the group message;
   and suggesting, by one or more computer processors, to the determined one or more recipients to unblock the topic with respect to the messaging group.

2. The computer-implemented method of claim 1, further comprising:
   receiving, by one or more computer processors, a summary request for the messaging group from a computing device, wherein the summary request is for one or more topics in the messaging group and a summary of messages for each topic of the one or more topics;
   determining, by one or more computer processors, the one or more topics in the messaging group;
   determining, by one or more computer processors, all messages for each topic of the one or more topics;
   and transferring, by one or more computer processors, a summary of the messaging group to the computing device,
   further comprising:
   determining that the topic is a new topic that the messaging group has not used before;
   and performing a feedback loop to relabel a plurality of previous messaging group messages with the new topic.

3. The computer-implemented method of claim 2, wherein the summary of the messaging group is for a time period.

4. The computer-implemented method of claim 2, wherein the summary of the messaging group includes, but is not limited to, a list of participants in the messaging group, the one or more topics in the messaging group, a number of text messages related to each topic of the one or more topics in the messaging group, a number of voice messages related to each topic of the one or more topics in the messaging group, a number of images related to each topic of the one or more topics in the messaging group, and a number of video related to each topic of the one or more topics in the messaging group.

5. The computer-implemented method of claim 1, further comprising:
   receiving, by one or more computer processors, a web history of a user in the messaging group, with the web history including a first web page;

determining, by one or more computer processors, a first topic that characterizes the first web page;
determining that the first topic is blocked;
and communicating to the user a communication that suggests unblocking the first topic in the messaging group.

6. A computer-implemented method for messaging, the computer-implemented method comprising:
receiving, by one or more computer processors, a group message in a messaging group;
determining, by one or more computer processors, a topic of the group message, with the determination of the topic of the group message including:
applying image recognition tools to a visual image included in the group message to extract descriptive text corresponding to the visual image of the group message, and determining the topic based, at least in part, on the descriptive text corresponding to the visual image of the group message;
determining, by one or more computer processors, that one or more recipients of the group message has blocked the topic of the group message;
and suggesting, by one or more computer processors, to the determined one or more recipients to unblock the topic with respect to the messaging group,
further comprising:
determining that the topic is a new topic that the messaging group has not used before;
and performing a feedback loop to relabel a plurality of previous messaging group messages with the new topic.

7. The computer-implemented method of claim 6, further comprising:
receiving, by one or more computer processors, a summary request for the messaging group from a computing device, wherein the summary request is for one or more topics in the messaging group and a summary of messages for each topic of the one or more topics;
determining, by one or more computer processors, the one or more topics in the messaging group;
determining, by one or more computer processors, all messages for each topic of the one or more topics;
and transferring, by one or more computer processors, a summary of the messaging group to the computing device.

8. The computer-implemented method of claim 7, wherein the summary of the messaging group is for a time period.

9. The computer-implemented method of claim 7, wherein the summary of the messaging group includes, but is not limited to, a list of participants in the messaging group, the one or more topics in the messaging group, a number of text messages related to each topic of the one or more topics in the messaging group, a number of voice messages related to each topic of the one or more topics in the messaging group, a number of images related to each topic of the one or more topics in the messaging group, and a number of video related to each topic of the one or more topics in the messaging group.

10. The computer-implemented method of claim 6 further comprising:
receiving, by one or more computer processors, a web history of a user in the messaging group, with the web history including a first web page;
determining, by one or more computer processors, a first topic that characterizes the first web page;
determining that the first topic is blocked;
and communicating to the user a communication that suggests unblocking the first topic in the messaging group.

11. A computer-implemented method for messaging, the computer-implemented method comprising:
receiving, by one or more computer processors, a group message in a messaging group;
determining, by one or more computer processors, a topic of the group message, with the determination of the topic of the group message including:
applying image recognition tools to a video included in the group message to extract descriptive text corresponding to the video of the group message, and determining the topic based, at least in part, on the descriptive text corresponding to the video of the group message;
determining, by one or more computer processors, that one or more recipients of the group message has blocked the topic of the group message;
and suggesting, by one or more computer processors, to the determined one or more recipients to unblock the topic with respect to the messaging group,
further comprising:
determining that the topic is a new topic that the messaging group has not used before;
and performing a feedback loop to relabel a plurality of previous messaging group messages with the new topic.

12. The computer-implemented method of claim 11, further comprising:
receiving, by one or more computer processors, a summary request for the messaging group from a computing device, wherein the summary request is for one or more topics in the messaging group and a summary of messages for each topic of the one or more topics;
determining, by one or more computer processors, the one or more topics in the messaging group;
determining, by one or more computer processors, all messages for each topic of the one or more topics;
and transferring, by one or more computer processors, a summary of the messaging group to the computing device.

13. The computer-implemented method of claim 12, wherein the summary of the messaging group is for a time period.

14. The computer-implemented method of claim 12, wherein the summary of the messaging group includes, but is not limited to, a list of participants in the messaging group, the one or more topics in the messaging group, a number of text messages related to each topic of the one or more topics in the messaging group, a number of voice messages related to each topic of the one or more topics in the messaging group, a number of images related to each topic of the one or more topics in the messaging group, and a number of video related to each topic of the one or more topics in the messaging group.

15. The computer-implemented method of claim 11 further comprising:
receiving, by one or more computer processors, a web history of a user in the messaging group, with the web history including a first web page;
determining, by one or more computer processors, a first topic that characterizes the first web page;
determining that the first topic is blocked;

and communicating to the user a communication that suggests unblocking the first topic in the messaging group.

\* \* \* \* \*